Patented July 2, 1935

2,006,875

UNITED STATES PATENT OFFICE 2,006,875

METHOD OF CYANIDE TREATMENT OF ORES

Joseph P. Ruth, Jr., Denver, Colo.

No Drawing. Application February 6, 1933, Serial No. 655,389

7 Claims. (Cl. 75—185)

This invention relates to improvements in methods of ore treatment and has reference more particularly to improvements in the method of cyanide treatment of ores.

I have found that a zinc cyanide coating will completely cover all of the sulfide surfaces when it is applied in a solution from which the soluble air has been removed.

I have also found that sulfides coated with cyanide in a de-aerated solution lose their affinity for air bubbles and will not collect in a froth as long as this cyanide coating remains.

I have also discovered that sulfides coated with zinc cyanide in a de-aerated solution, cannot readily form oxides in the pulp when agitated with air.

The importance of these discoveries to the cyanide process of treating ores is apparent because the cyanide employed in the agitating and dissolving period does not spend itself on the oxides of the sulfides which would be formed in the absence of this coating.

In a cyanide test on an ore containing mixed sulfides, which had been coated with zinc cyanide in a de-aerated solution, I expected to get complete dissolution of the gold by the cyanide solution, I found, however, that the rapid dissolving action ceased after about two hours. The cyanide in solution was high since no oxides were formed to consume the cyanide. The explanation of this being that the reducing sulfides had been coated with zinc cyanide so that only very little or no cyanicides could form.

Other tests have shown, that, even with the reducing sulfides coated, a critical dissolving point is soon reached at which any further dissolving of gold is accomplished only by agitating a long time with air, and then in relatively small amounts.

Tests always disclosed the presence of cyanide in ample strength and I therefore made further and careful investigation.

From tests that I have made I have found that the soluble gas contained in the cyanide solution at the beginning of the treatment consisted of 35% oxygen and 65% nitrogen. After the solution had been agitated for periods running from two to four hours, I found that the oxygen content had been reduced below the normal for tap water. After very long periods of aeration with some ores I found that as much as 60% of the oxygen originally contained had been consumed and I also discovered that no amount of aeration would increase the oxygen content.

Knowing that oxygen is indispensable in the process of dissolving gold by cyanide, I attempted, by agitation and aeration, to bring the oxygen content back to the original amount but without success. Since there were no active reducing sulfides present (they had been coated) I concluded that there must be some physical reason why the oxygen content could not be raised, and that the difficulty was not altogether chemical. I concluded that the mass action of the oxygen present was not sufficient to force the reaction necessary to dissolve the gold.

The coefficient of absorption for oxygen is .04890 and for nitrogen .02348; (Rosco and Schorlemmers Treatis on Chemistry, 5th Ed. vol. 1, pages 312 to 313) this being the case oxygen should go into solution twice as fast as nitrogen which it would not do however.

I have learned that when a mixture of two gases is dissolved in a liquid (at a constant pressure and temperature) they must reach a definite per cent and that this amount cannot be increased as long as the pressure and temperature remain the same.

In carrying out my cyanide test I was using dissolved oxygen and leaving the nitrogen and was attempting to replenish the oxygen by blowing air into the liquid. Air, as is well known, contains 20% of oxygen, 79% of nitrogen and 1% of inert gas, but for the purpose of this specification will be considered as being composed of 20% oxygen and 80% nitrogen. Since the oxygen and nitrogen are absorbed at different rates but always in the same ratio, and since the oxygen was continually being consumed while the nitrogen was not consumed, it is evident that the proportion of oxygen to nitrogen was constantly decreasing. It is apparent that the original proportions of the two gases can not be reestablished by aeration alone.

Let us assume that water will absorb 4% by volume of gas and that the oxygen will form 35% thereof, while the nitrogen will form the remainder or 65%. If the oxygen is now depleted until only 15% remains while the nitrogen is not removed the quantity of gas will be 80% of normal. If we attempt to replace the 20% of oxygen by blowing air into the liquid it will absorb both oxygen and nitrogen and the proportion of nitrogen will therefore increase while that of oxygen decreases. It is evident from the above that after the oxygen content has been decreased, it cannot be brought back to the original molecular concentration by aeration, as both oxygen and nitrogen will be absorbed. It is possible, however, to employ oxygen gas for this purpose, but this involves a cost that is prohibitive.

I have found that after the oxygen has been depleted beyond the critical point, the molecular concentration can be restored to normal by subjecting the liquid, or pulp, to a vacuum whereby the stabilized oxygen and nitrogen remaining in the liquid are removed. The deaerated solution is now aerated with air and the oxygen and nitrogen will then be absorbed in the proper proportion and the gold will once more go into solution as rapidly as at the beginning of the treatment.

The discovery described above when applied to the cyanide treatment of ores makes it possible to reduce the period of agitation and to take into solution a greater quantity of gold than has heretofore been possible and with a material reduction in the consumption of cyanide.

The idea of subjecting the pulp to a vacuum after the critical dissolving point has been reached may be made use of practically, in a number of ways.

The entire pulp may be made to trickle over a lattice work so as to expose a thin film having a large surface and subjecting this film to a vacuum of sufficient value to remove the oxygen and nitrogen, thus expediting the removal of the dissolved gases. The pulp is then subjected to the usual agitation and aeration. The pulp may be filtered and repulped with water or a water solution, from which the critical gas content has been removed by a vacuum, and air re-absorbed in the proportion of 35% of oxygen and 15% of nitrogen.

The method of treatment of ores contemplated may be described as follows:

When the ore is ground with water from which all of the oxygen has been removed by a vacuum treatment and which therefore contains practically no soluble oxygen, the zinc cyanide can be added to the grinding water. Zinc cyanide is formed by combining sodium cyanide with zinc sulfate. If the zinc sulfate is in excess, the zinc cyanide formed will be an insoluble white precipitate. If the cyanide solution is in excess, the zinc cyanide formed will be soluble. Either the insoluble or the soluble zinc cyanide can be used depending on the particular ore under treatment. Many zinc ores contain sufficient zinc sulfate to form the necessary zinc cyanide when sodium cyanide is added to the pulp.

The amount of sodium cyanide required depends entirely upon what is required to maintain the standard cyanide solution and this is determined by subjecting the solution to periodic tests to find the amount of cyanide that has been used or which remains. The amount of cyanide required to reestablish the standard solution is added at any convenient place. That free oxygen is necessary in a cyanide solution for the dissolution of gold is clearly evident from Elsner's equation which is as follows:

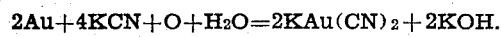

$$2Au + 4KCN + O + H_2O = 2KAu(CN)_2 + 2KOH.$$

After the ore has been ground the pulp is subjected to an agitation period with cyanide until the gold dissolving equilibrium is reached, after which the pulp is subjected to a vacuum treatment which removes from the pulp solution the dissolved gases, which consist principally of nitrogen, and puts the solution in condition to reabsorb oxygen and nitrogen in their normal proportions; the pulp is now agitated with air whereupon the oxygen concentration is increased to such an extent that the cyanide action will proceed at its maximum rate.

The step of grinding the ore in oxygen free water can be dispensed with and the ore can be ground in oxygen saturated water or in a cyanide solution, as is the present practice. The step of grinding in oxygen free water is more especially applicable when the ore to be cyanided contains large quantities of reducing sulfides which must be neutralized so that they will not form ferrous sulfides and/or sulphates.

Having described the invention what I claim is:

1. The method of restoring the relative amounts of oxygen and nitrogen to a solution from which a portion of the oxygen has been removed which consists in subjecting the solution to the action of a vacuum of such value that the oxygen and the nitrogen that remains are removed and then aerating the solution whereby the oxygen and nitrogen will be reabsorbed in their normal proportions.

2. The method of restoring the relative amounts of oxygen and nitrogen to a solution from which one of the gases has been removed until the normal proportions have been altered which consists in subjecting the solution to the action of a vacuum of such value that the oxygen and the nitrogen which remains in the solution are removed and then agitating the solution in contact with air whereby oxygen and nitrogen will be reabsorbed in their normal proportions.

3. The method of restoring the relative amounts of oxygen and nitrogen to an ore pulp from which one of the gases has been removed to such an extent as to alter their normal proportions which comprises, subjecting the pulp to the action of a vacuum of such degree and duration that it will remove substantially all of the remaining portions of the oxygen and nitrogen and then agitating the pulp in the presence of air whereby it will reabsorb oxygen and nitrogen in their normal proportions.

4. In the method of dissolving gold by the action of cyanide, the steps of replenishing the oxygen content of a pulp in which the oxygen has been reduced to a point below that required for the cyanide reaction which comprises, subjecting the pulp to the action of a vacuum of such value that the oxygen and the nitrogen remaining in solution are removed, and agitating the pulp in contact with air whereby the oxygen and nitrogen will be reabsorbed in their proper proportions.

5. The method of treating ores with cyanide which consists in adding zinc cyanide to the pulp and agitating in the presence of air until the oxygen content of the pulp has been reduced to such an extent that the cyanide reaction substantially ceases, subjecting the pulp to the action of a vacuum of such value that it will remove the remaining quantities of oxygen and nitrogen, continuing the vacuum treatment until these gases are removed and then agitating the pulp in the presence of air whereby oxygen and nitrogen will be reabsorbed in their normal proportions.

6. In the cyanide method of treatment of ores the steps of, grinding the ore with water from which all of the oxygen has been removed, adding zinc cyanide to the grinding water, agitating the ore pulp, so ground, in the presence of air until the equilibrium point of the solubility of gold by the cyanide consumption is reached, subjecting the pulp to a vacuum of such value that it will remove the excess of nitrogen and the remaining oxygen, continuing the vacuum treatment until these gases are removed, and subjecting the degassed pulp to agitation in the presence of air whereby oxygen and nitrogen will be reabsorbed and whereby the dissolving process will be recommenced.

7. In the cyanide process of the treatment of ores, the steps of, grinding the ore in the absence of soluble oxygen and in the presence of zinc cyanide, subjecting the pulp to an agitation period with cyanide whereby gold is dissolved, continuing the agitation until the gold dissolving equilibrium period is reached, subjecting the pulp to a vacuum of sufficient value and duration for removing the dissolved nitrogen, and submitting the pulp to a further agitation in contact with air for the reabsorbtion of oxygen and nitrogen in proper proportions and for the further removal of gold.

JOSEPH P. RUTH, Jr.